W. H. MILLER.
Rake and Spade
No. 59,050. Patented Oct. 23, 1866.
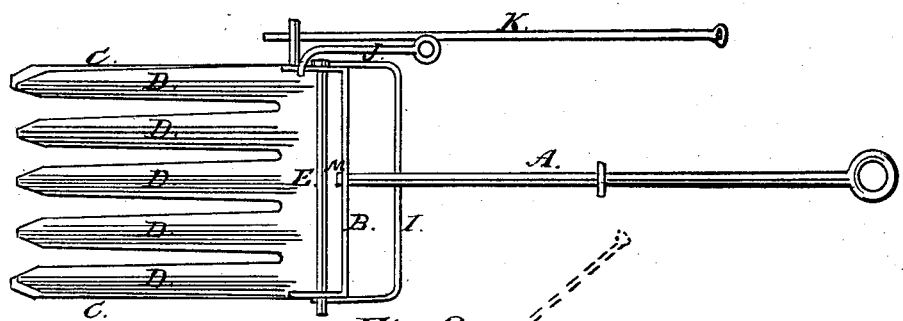
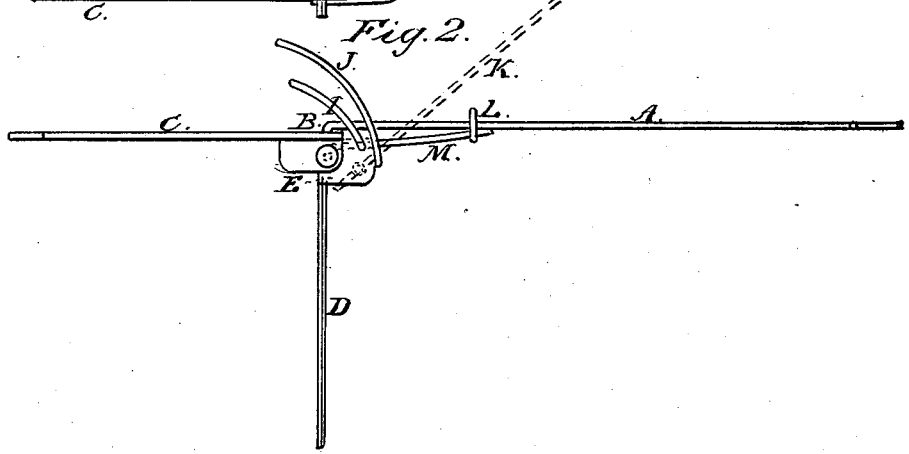
Witnesses:
J. A. Service
F. A. Jackson
Inventor:
W. H. Miller
Per Munro & C.
Attys.

UNITED STATES PATENT OFFICE.

W. H. MILLER, OF BRANDENBURG, KENTUCKY.

IMPROVEMENT IN COMBINED RAKE AND SPADE.

Specification forming part of Letters Patent No. 59,050, dated October 23, 1866.

*To all whom it may concern:*

Be it known that I, W. H. MILLER, of Brandenburg, in the county of Meade and State of Kentucky, have invented a new and Improved Combined Rake and Spade; and I do hereby declare that the following is a full, clear, and exact description thereof, which will enable others skilled in the art to make and use the same, reference being had to the accompanying drawings, forming part of this specification.

The present invention relates to an extremely novel and simple implement, which combines a rake and spade in such a manner that it can be readily and easily adjusted or adapted for either a rake or spade, according as may be desired.

In the accompanying plate of drawings my combined rake and spade is illustrated, Figure 1 being a plan or top view of the implement when adjusted for use as a spade, and Fig. 2 an edge or side view of the implement when adjusted for use as a rake.

Similar letters of reference indicate like parts.

A in the drawings represents the handle of the implement, to one end of which is secured a cross-bar, B, having at each end a projecting prong, C, which extends in directions parallel to each other and at right angles to the said cross-bar B, both being sharpened or pointed at their outer ends.

To the cross-bar B a series of parallel rake-teeth, D, by their common cross-bar E at their tail ends, are hung so as to swing thereon.

This rake-tooth frame in Fig. 1 is shown as laid or flat upon the frame composed of the bar B and prongs C, and when in this position the implement is adapted for use as a spade, it being forced into the ground as an ordinary spade. When swinging up the rake-tooth frame the dirt can be thrown up, as is obvious.

To throw up the rake-tooth frame I have provided it with a handle, which may be in the form of a cross-bar, I, passing under the main handle of the implement, or in the form of a lever-arm, J, or in the form of a detached lever-handle, K, the same end being accomplished in either case.

When the implement is to be used as a rake the rake-tooth frame is swung into a position at right angles to the main cross-bar B, when, by sliding the clasp or ring L of the handle-rod A over the arm M attached to the said frame, it is there secured, and consequently in position for being used as a rake, as is plainly shown in Fig. 2 of the drawings.

Having thus described my invention, I claim as new and desire to secure by Letters Patent—

The combined rake and spade, made and adjusted substantially as described.

The above specification of my invention signed by me.

W. H. MILLER.

Witnesses:
BEN KENDALL,
I. G. WALKER.